US006856888B2

(12) United States Patent
Kawai

(10) Patent No.: US 6,856,888 B2
(45) Date of Patent: Feb. 15, 2005

(54) VEHICULAR CONTROL SYSTEM

(75) Inventor: Katsuhiko Kawai, Nagoya (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 10/806,374

(22) Filed: Mar. 23, 2004

(65) Prior Publication Data

US 2004/0193356 A1 Sep. 30, 2004

(30) Foreign Application Priority Data

Mar. 24, 2003 (JP) ........................................ 2003-079368

(51) Int. Cl.[7] ............................ G06F 7/00; F02D 41/14
(52) U.S. Cl. .......................................... 701/103; 700/45
(58) Field of Search ................................ 701/103, 102, 701/101; 700/38, 45

(56) References Cited

U.S. PATENT DOCUMENTS 3,758,762 A * 9/1973 Littman et al. ............... 700/45
4,714,988 A * 12/1987 Hiroi et al. .................... 700/45
5,479,897 A 1/1996 Kawai et al. ............ 123/339.2

FOREIGN PATENT DOCUMENTS

JP 61-21505 A * 1/1986 ........... G05B/13/04
JP 64-64003 A * 3/1989 ........... G05B/11/32
JP 2001-61292 A * 3/2001 ............. H02P/7/00

* cited by examiner

*Primary Examiner*—Hieu T. Vo
(74) *Attorney, Agent, or Firm*—Nixon & Vanderhye P.C.

(57) ABSTRACT

In an air-fuel ratio control system, a gain Kh is adaptively determined on the basis of a value z obtained by multiplying a target fuel amount difference value Δym (derivative value of a target fuel amount) by an error e between a target excess fuel ratio (target ϕ) and an actual excess fuel ratio (actual ϕ) detected by an air-fuel ratio sensor. A value obtained by multiplying the target fuel amount difference value Δym by the gain Kh is determined as an F/F corrected value ucmp. In this case, when the error e between the target ϕ and the actual ϕ is determined in consideration of the fact that a controlled system has dead time d, a target ϕd at the point in time going back in the past by the amount of the dead time d is used to obtain error e=target ϕd−actual ϕ.

10 Claims, 9 Drawing Sheets

VEHICULAR CONTROL SYSTEM

CROSS-REFERENCE TO RELATED APPLICATION

This application is based on Japanese Patent Application No. 2003-79368 filed Mar. 24, 2003, the disclosure of which is incorporated herein by reference.

FIELD OF THE INVENTION

The present invention relates to a vehicular control system disposed with a feedforward control function.

BACKGROUND OF THE INVENTION

In relation to vehicular control systems, there are vehicular control systems such as described in Japanese Patent No. 3316955 where a controlled system is modeled, a model constant is calculated in real time, a feedback gain is calculated on the basis of the model constant, and a controlled value of a controlled system is made to follow a target value to conduct feedback control.

However, because an error between the target value and the actual controlled value is generated and the feedback control works to reduce this error, there has been the drawback that responsiveness is relatively slow.

Thus, a control system configured to combine and execute feedforward control, whose responsiveness is fast, with feedback control has been developed.

However, because conventional feedforward control has been configured to calculate a feedforward corrected value using a predetermined gain, there has been the drawback that the effects of characteristic variations in the controlled system arising due to variations in the manufacture of the controlled system, temporal changes and changes in environmental conditions and operational conditions are not reflected in the feedforward corrected value, so that the control precision of feedforward control changes due to characteristic variations in the controlled system.

SUMMARY OF THE INVENTION

An object of the present invention is to provide a vehicular control system that can conduct feedforward control reflecting the effects resulting from characteristic variations in a controlled system and can execute highly responsive and highly precise feedforward control.

In order to achieve this object, the invention provides a vehicular control system that conducts feedforward control so that a controlled value of a controlled system disposed in a vehicle is made to follow a target value, the vehicular control system comprising: gain calculating means for adaptively determining a gain based on a value obtained by multiplying a derivative value of the target value by the error between the target value and the actual controlled value; and feedforward corrected value calculating means for determining, as a feedforward corrected value, a value obtained by multiplying the gain by the derivative value of the target value.

By configuring the vehicular control system in this manner, the gain can be automatically adjusted in accordance with characteristic variations in the controlled system, feedforward control reflecting effects resulting from characteristic variations in the controlled system can be conducted, and the control precision of feedforward control can be improved.

Moreover, because a control equation that calculates the input (control input) of the controlled system from the target value serves as an inverse model of the transfer function of the controlled system, as will be described later, the output (controlled value) of the controlled system can be made to match the target value and highly responsive feedforward control can be realized.

In the present invention, because the derivative value of the target value used in calculating the feedforward corrected value becomes 0 in a steady state where the target value does not change, the effects of steady-state deviation between the target value and the actual controlled value can be eliminated by multiplying the derivative value of the target value.

DESCRIPTION OF THE PREFERRED EMBODIMENTS

First Embodiment

A first embodiment where the invention is applied to an electronic throttle system will be described below on the basis of FIGS. 1 to 4B.

Figure 1:
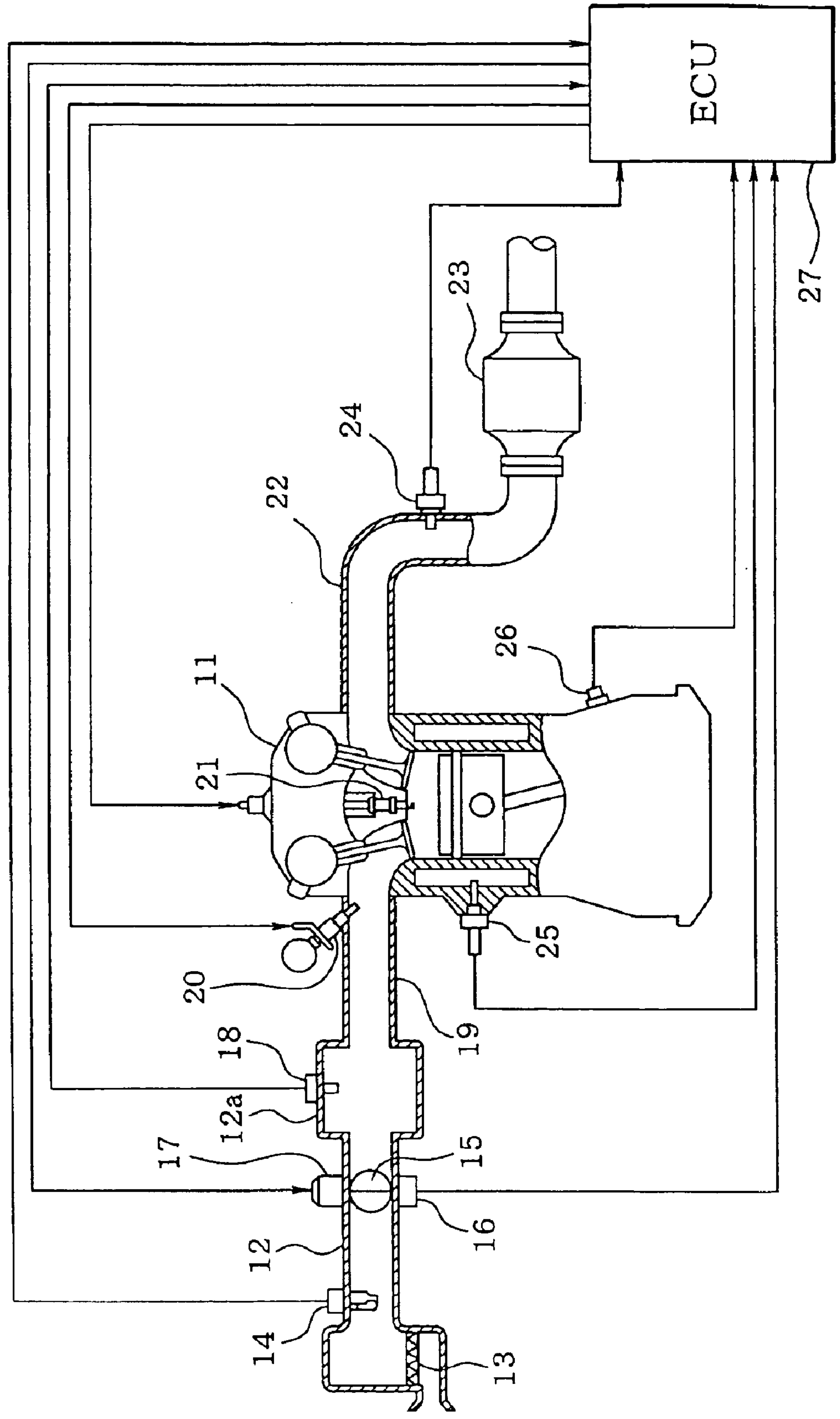
FIG. 1 is a diagram showing the schematic configuration of an entire engine control system in a first embodiment of the invention.

A schematic configuration of an entire engine control system is described on the basis of FIG. 1. An air cleaner 13 is disposed at the most upstream portion of an intake pipe 12 of an engine 11, which is an internal combustion engine, and an air flow meter 14 that detects the intake air amount is disposed at a downstream side of the air cleaner 13. A throttle valve 15 whose opening is adjusted by a motor 17 such as a DC motor and a throttle opening sensor 16 that detects the throttle opening are disposed at a downstream side of the air flow meter 14.

A surge tank 12*a* is disposed at a downstream side of the throttle valve 15, and an intake pipe pressure sensor 18 that detects the intake pipe pressure is disposed at the surge tank 12*a*. An intake manifold 19 that introduces air to each cylinder of the engine 11 is disposed at the surge tank 12*a*, and a fuel injection valve 20 that injects fuel is attached in the vicinity of an intake port of the intake manifold 19 of each cylinder. A spark plug 21 is attached to each cylinder at a cylinder head of the engine 11. Mixed air inside the pipes is combusted by the spark discharge of each spark plug 21.

A catalyst 23 such as a three-way catalyst that purifies CO, HC and NOx in exhaust gas is disposed at an exhaust pipe 22 of the engine 11, and an air-fuel ratio sensor 24 (or oxygen sensor) that detects the air-fuel ratio of the exhaust gas is disposed at an upstream side of the catalyst 23. A water temperature sensor 25 that detects the cooling water temperature and a crank angle sensor 26 that outputs a pulse signal each time a crankshaft of the engine 11 revolves by a constant crank angle (e.g., 30° CA) are disposed at a cylinder block of the engine 11. The crank angle and the engine revolving speed are detected on the basis of the output signal of the crank angle sensor 26.

The output of each sensor is inputted to an engine control circuit (represented below as "ECU") 27. The ECU 27 is mainly configured by a microcomputer and executes various engine control programs stored in an internally disposed ROM (Read Only Memory), whereby the ECU 27 controls the fuel injection amount of the fuel injection valve 20 and the ignition timing of the spark plugs 21 depending on an operation state of the engine.

Moreover, the ECU 27 uses an electronic throttle system as feedforward control (represented below as "F/F control") and feedback control (represented below as "F/B control") to control the throttle opening to a target throttle opening set in accordance with an accelerator opening (accelerator control input) detected by an accelerator sensor (not shown). In this case, the ECU 27 executes a later-described electronic throttle control program of FIG. 3, whereby the ECU 27 corrects, by adaptive control, excess and deficiency with the F/F control and the F/B control.

Figure 2:
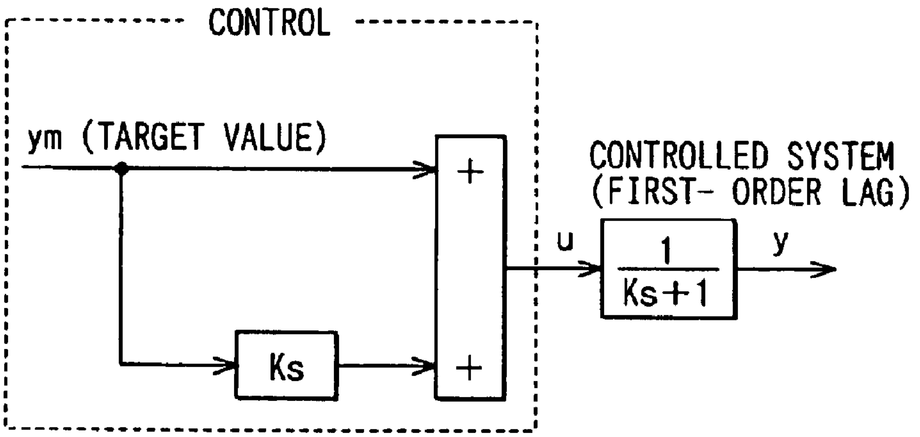
FIG. 2 is a block diagram describing a derivation method of a control expression used in the first embodiment.

A control used in the electronic throttle control program of FIG. 3 will be described below. In the first embodiment, as shown in FIG. 2, a controlled system (electronic throttle system) is approximated by a first-order lag system. In this case, an output y (actual throttle opening) of the controlled system can be made to match a target value ym (target throttle opening) as long as the control (inverse model of transfer function of the controlled system) in the dotted lines of FIG. 2 can be realized.

However, because a time constant K of the controlled system is unknown or varies, it cannot be expressed with the control equation of FIG. 2.

Thus, in the first embodiment, a method that detects and controls the time constant K of the controlled system is adopted.

Here, the control equation of the transfer function is expressed by the following equation when the estimated value of the time constant K is represented by Kh.

$$u=ym+Khsym$$

u: input of controlled system s: Laplace operator

When this is assigned to the transfer function of the controlled system, it becomes the following equation.

$$y=(Khs+1)/(Ks+1)\cdot ym$$

Here, when error e between the target value ym and the actual output y is defined as e=ym−y and the above equation is assigned, the error e is expressed as follows.

$$\begin{aligned} e &= \{1-(Khs+1)/(Ks+1)\}ym \\ &= (K-Kh)s/(Ks+1)\cdot ym \\ &= 1/(Ks+1)\cdot(K-Kh)sym \end{aligned}$$

Because 1/(Ks+1) is a strictly positive real (K>0) in the above equation, the following equation is obtained by adaptive control theory.

$$d(K-Kh)/dt=-\gamma\cdot dym/dt\cdot e(\gamma>0)$$

The following equation is derived from the above equation.

$$dKh/dt=\gamma\cdot dym/dt\cdot e$$

Using the above equation, Kh→K is guaranteed by adjusting Kh (estimated value of the time constant K).

Thus, by controlling with the above equation using Kh calculated by the above equation, the controlled value y can be made to match the target value ym.

$$u=ym+Kh\cdot dym/dt$$

From the above equation, an F/F corrected value (feedforward corrected value) ucmp is represented by the following equation.

$$ucmp=Kh\cdot dym/dt$$

Figure 3:
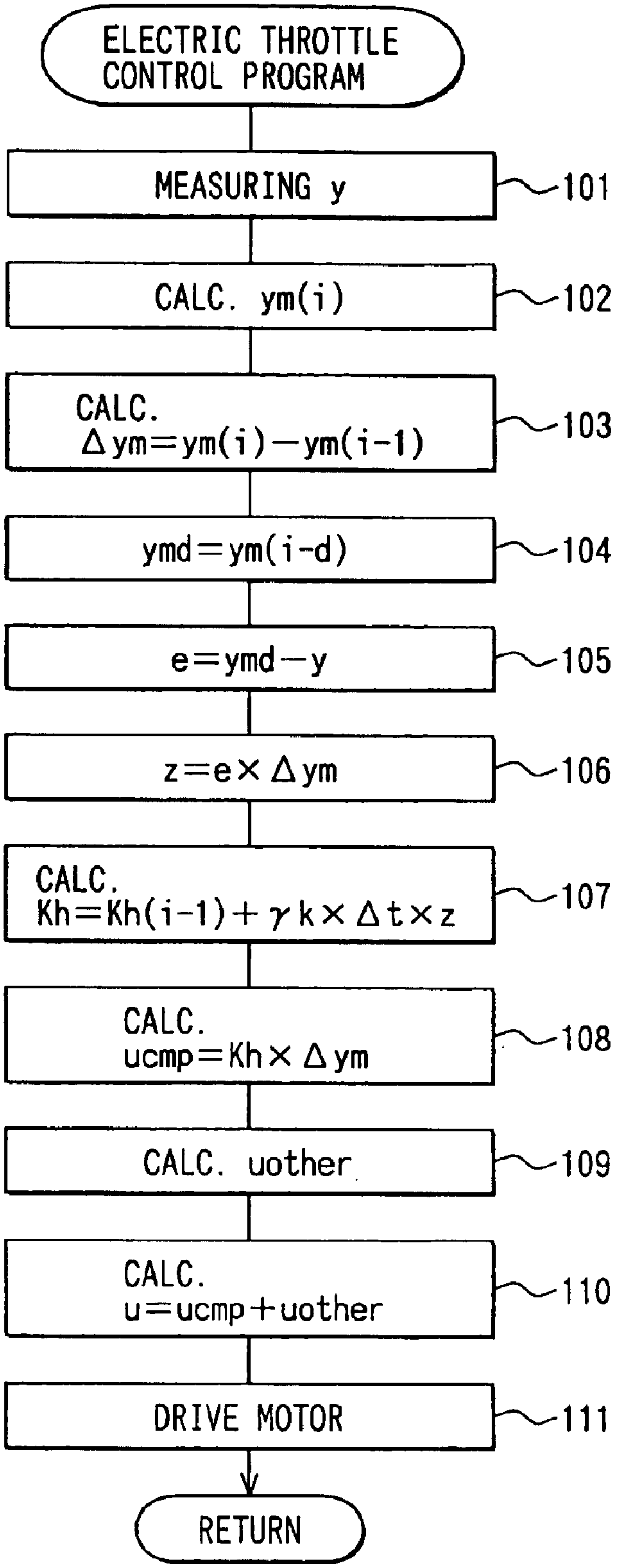
FIG. 3 is a flow chart showing the flow of processing of an electronic throttle control program of the first embodiment.

The ECU 27 periodically executes the electronic throttle control program of FIG. 3, whereby it functions as gain calculating means and feedforward corrected value calculating means which are referred to in the present invention, the ECU 27 adaptively determines the gain Kh (estimated value of the time constant K) on the basis of a value z obtained by multiplying a derivative value Δym of the target throttle opening by the error e between the target throttle opening ym (target value) and the actual throttle opening y (actual controlled value), and determines, as the F/F corrected value ucmp, a value obtained by multiplying the derivative value Δym of the target throttle opening by the gain Kh.

In this case, when the error e between the target throttle opening ym and the actual throttle opening y is determined with consideration given to the fact that the controlled system has dead time d, a target throttle opening ymd at the point in time going back in the past by the amount of the dead time d is used to obtain error e=ymd−y. The specific processing content of the electronic throttle control program of FIG. 3 will be described below.

When the program is started, first the actual throttle opening y (actual controlled value) is measured in step 101 by the throttle opening sensor 16, and the target throttle opening ym (i) is calculated in step 102 on the basis of the accelerator opening. Thereafter, the program proceeds to step 103, where the difference value Δym (derivative value of the target value) between the current value ym (i) of the target throttle opening and the previous value ym (i−1) is calculated.

$$\Delta ym=ym(i)-ym(i-1)$$

Then, in step 104, the target throttle opening ym (i−d) at the point in time going back in the past by the amount of the dead timed is read and dead time processing is implemented. Thereafter, the program proceeds to step 105, where the error e (=ymd−y) between the target throttle opening ymd and the actual throttle opening y is calculated.

Thereafter, the program proceeds to step 106, where the value z (=e×Δym), which is obtained by multiplying the target throttle opening difference value Δym by the error e, is calculated. Thereafter, the program proceeds to step 107, where the gain Kh (estimated value of the time constant K) is calculated by the following equation.

$$Kh=Kh(i-1)+\gamma_k\times\Delta t\times z$$

Here, Kh (i−1) is the previous gain, $\gamma_k$ is a constant (>0) and Δt is the control period.

Then, in step 108, the target throttle opening difference value Δym is multiplied by the gain Kh to determine the F/F corrected value ucmp.

Thereafter, the program proceeds to step 109, where another corrected value uother such as an F/B corrected value is calculated. Thereafter, the program proceeds to step 110, where the other corrected value uother is added to the F/F corrected value ucmp to determine the control input u.

$$u=ucmp+uother$$

It should be noted that the program may also be configured so that ucmp and uother are determined by a correction factor and ucmp and uother are multiplied by a base value to determine the control input u.

Then, in step 111, the motor 17 is driven by the control input u so that the actual throttle opening y is made to match the target throttle opening ym.

In the above-described first embodiment, the electronic throttle system is configured so that the F/F control is corrected by adaptive control. Thus, the gain Kh of the F/F control can be automatically adjusted in accordance with characteristic variations in the controlled system (electronic throttle system), F/F control reflecting effects resulting from changes in the characteristics of the controlled system can be conducted, and the control precision of the F/F control can be improved. Moreover, because the control equation calculating the input (control input u) of the controlled system from the target throttle opening ym (target value) serves as an inverse model of the transfer function of the controlled system, the output of the controlled system (actual throttle opening y) can be made to match the target value (target throttle opening ym), and highly responsive F/F control can be realized.

Moreover, in the first embodiment, when the error e between the target throttle opening ym (target value) and the actual throttle opening y (actual controlled value) is determined in consideration of the fact that the electronic throttle system, which is the controlled system, has dead time d, the target throttle opening ymd at the point in time going back in the past by the amount of the dead time d is used to obtain error e=ymd−y. Thus, even in a case where the controlled system has dead time d, F/F control where the effects of the dead time d have been removed can be executed, and the control precision of the F/F control can be excellently maintained.

Figure 4A:
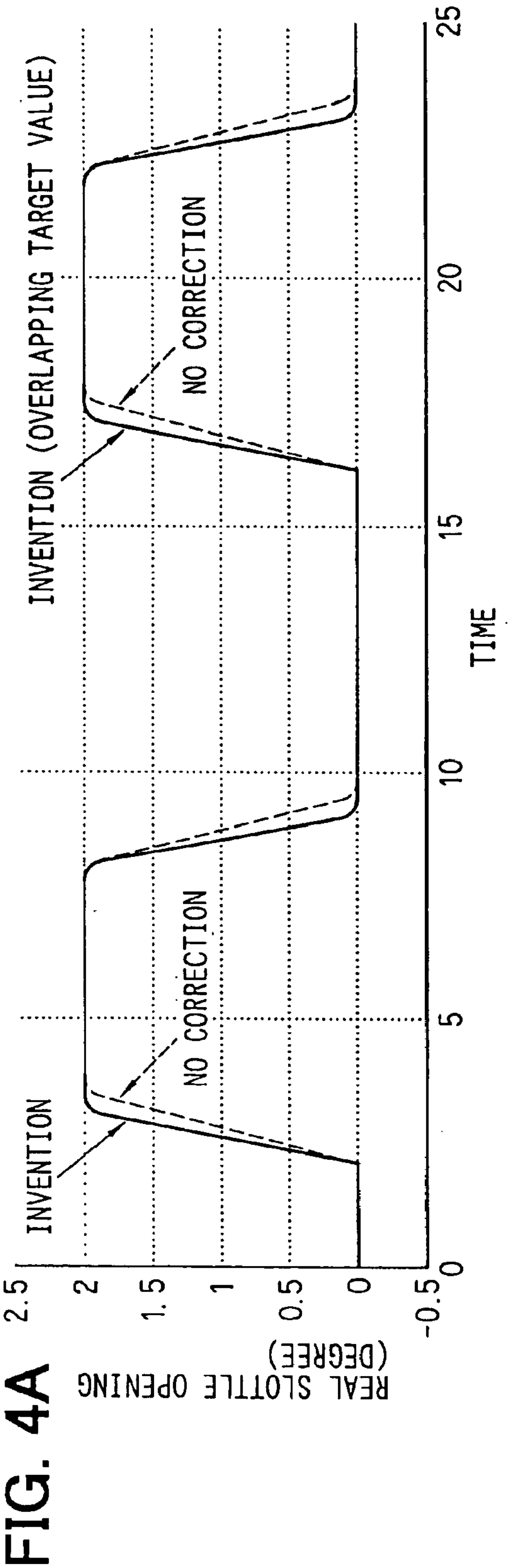
FIGS. 4A and 4B are time charts describing an example of the electronic throttle control of the first embodiment.
Figure 4B:
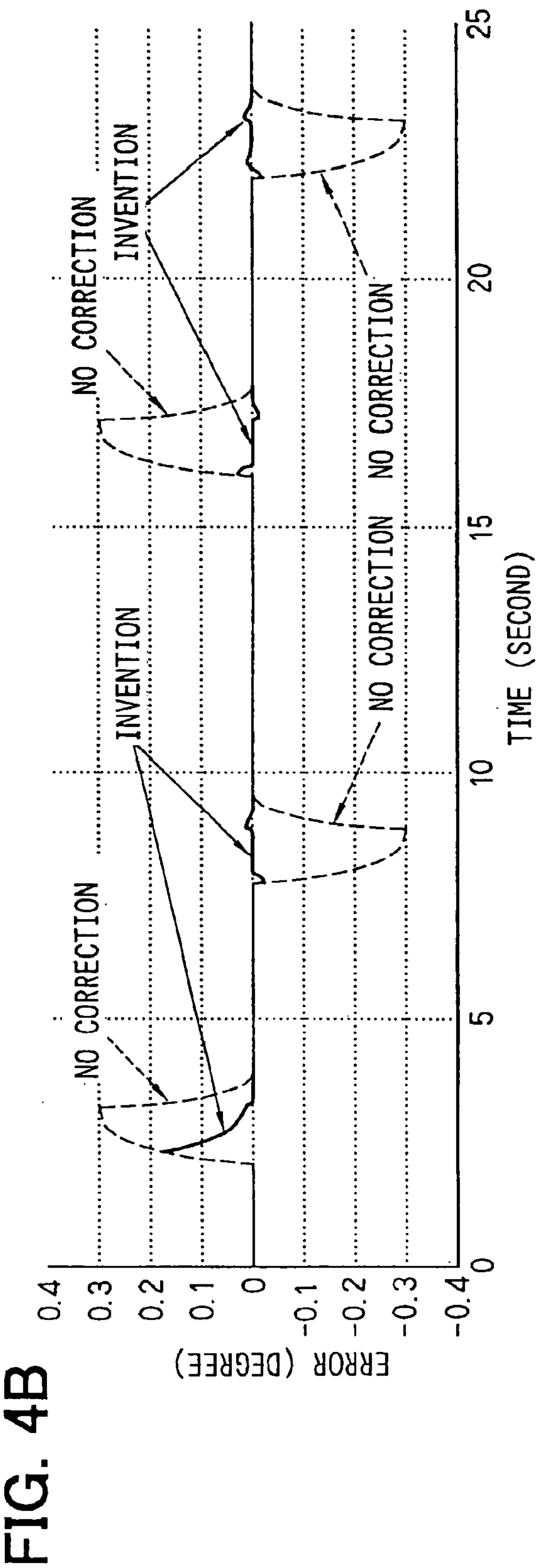

Thus, as shown in FIGS. 4A and 4B, in the first embodiment, highly responsive and highly precise electronic throttle control can be realized by correction resulting from adaptive control in comparison to a conventional system where there is no correction resulting from adaptive control.

Second Embodiment

Figure 5:
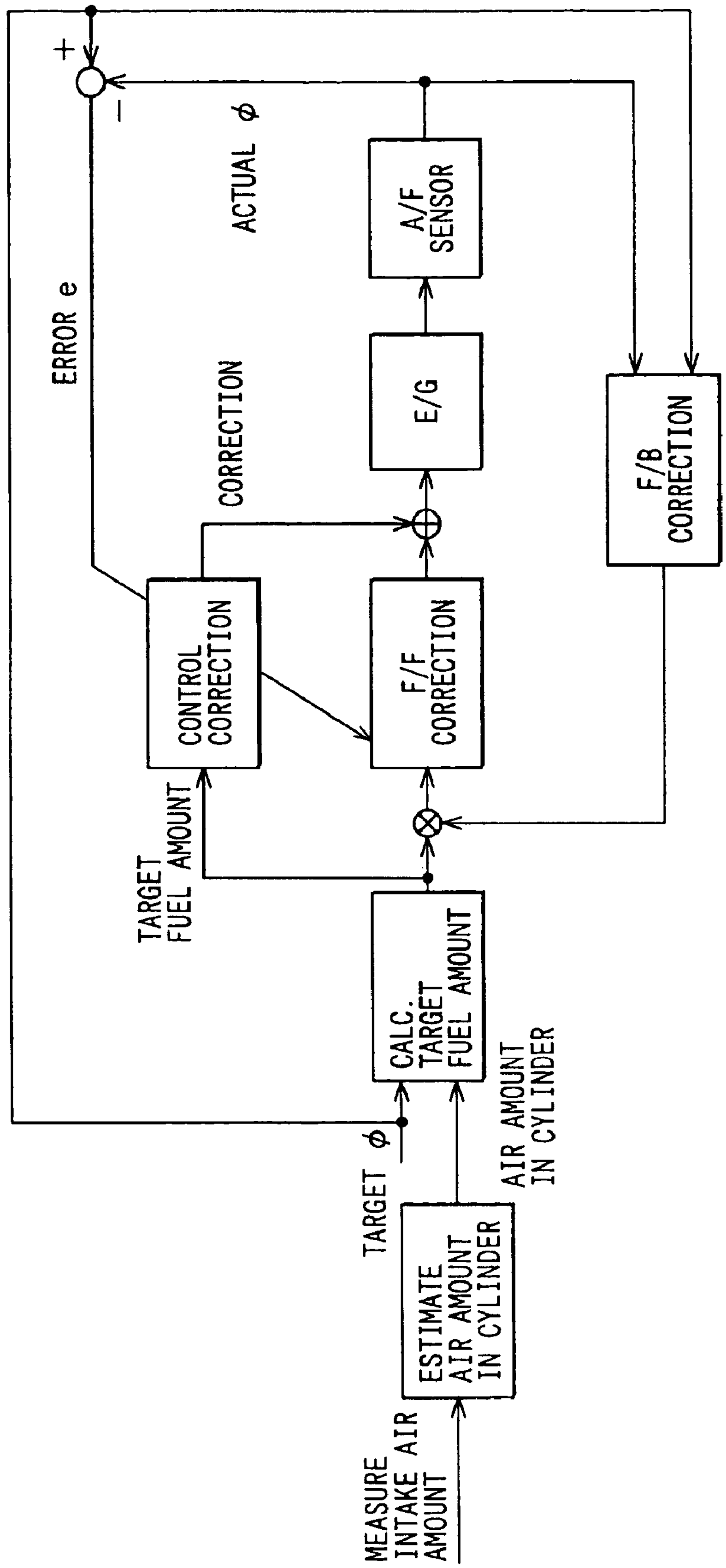
FIG. 5 is a block diagram describing an air-fuel ratio control system of a second embodiment.
Figure 6:
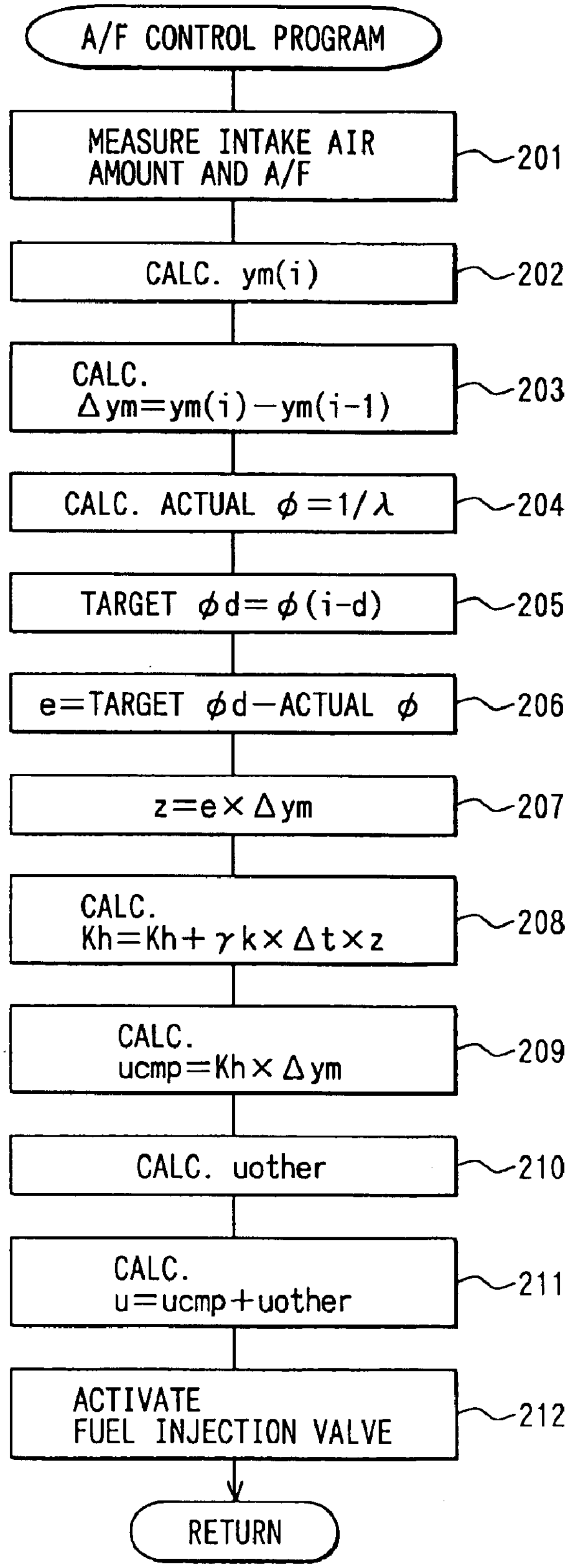
FIG. 6 is a flow chart showing the flow of processing of an air-fuel control program of the second embodiment.

Next, a second embodiment where the invention is applied to an air-fuel ratio control system will be described on the basis of FIGS. 5 and 6. When an air-fuel control system is used as the controlled system, consideration is given to the fact that the target value is the target fuel amount and the output (controlled value) of the controlled system becomes the air-fuel ratio (A/F; excess air ratio λ, excess fuel ratio ϕ) detected by the air-fuel ratio sensor 24 disposed at the exhaust pipe 22, the gain Kh is adaptively determined on the basis of the value z obtained by multiplying the target fuel amount difference value Δym (derivative value of the target fuel amount) by the error e between the target excess fuel ratio (represented below as "target ϕ") and the actual excess fuel ratio (represented below as "actual ϕ") detected by the air-fuel ratio sensor 24, and a value obtained by multiplying the target fuel amount difference value Δym by the gain Kh is determined as the F/F corrected value ucmp. In this case, when the error e between the target ϕ and the actual ϕ is determined in consideration of the fact that the controlled system has dead time d, the target ϕ (=ϕd=ϕ (i−d)) at the point in time going back in the past by the amount of the dead time d is used to obtain the error e=target ϕd−actual ϕ. The specific processing content of an air-fuel ratio control program of FIG. 6 will be described below.

When the program is started, first the intake air amount and the air-fuel ratio are measured in step 201, and the target fuel amount ym (i) is calculated in step 202 on the basis of the intake air amount. Thereafter, the program proceeds to step 203, where the difference value Δym (derivative value of the target value) between the current value ym (i) of the target fuel amount and the previous value ym (i−1) is calculated.

$$\Delta ym=ym(i)-ym(i-1)$$

Then, in step 204, the actual ϕ (=1/λ) is calculated from the measured air-fuel ratio. Thereafter, the program proceeds to step 205, where the target ϕ (i−d) at the point in time going back in the past by the amount of dead time d is read and dead time processing, where ϕd=ϕ (i−d), is implemented. Thereafter, the program proceeds to step 206, where the error e (=target ϕd−actual ϕ) between the target ϕd at the point in time going back in the past by the amount of the dead time d and the actual ϕ is calculated.

Thereafter, the program proceeds to step 207, where the value z (=e×Δym), which is obtained by multiplying the target fuel amount difference value Δym by the error e, is calculated. Thereafter, the program proceeds to step 208, where the gain Kh (estimated value of the time constant K) is calculated by the following equation.

$$Kh=Kh(i-1)+\gamma_k\times\Delta t\times z$$

Here, Kh (i−1) is the previous gain, $\gamma_k$ is a constant (>0) and Δt is the control period.

Then, in step 209, the target fuel amount difference value Δym is multiplied by the gain Kh to determine the F/F corrected value ucmp.

$$ucmp=Kh\times\Delta ym$$

Thereafter, the program proceeds to step 210, where another corrected value uother such as a basic injection amount and an F/B corrected value is calculated. Thereafter, the program proceeds to step 211, where the other corrected value uother is added to the F/F corrected value ucmp to determine the control input u.

$$u=ucmp+uother$$

It should be noted that the program may also be configured so that ucmp and uother are determined by a correction factor and ucmp and uother are multiplied by a base value to determine the control input u.

Then, in step 212, the fuel injection valve 20 is driven by the control input u so that the actual $\phi$ is made to match the target $\phi$.

In the above-described second embodiment, the air-fuel ratio control system is configured so that the F/F control is corrected by adaptive control. Thus, highly responsive and highly precise air-fuel ratio control can be realized.

Moreover, in the second embodiment, in consideration of the fact that the target value is the target fuel amount and the output of the controlled system becomes the air-fuel ratio, the excess fuel ratio $\phi$, which is the inverse number $(1/\lambda)$ of the excess air ratio, is used as the air-fuel ratio information rather than the excess air ratio $\lambda$. Thus, there is the advantage that the directions of increase and decrease of the target value (target fuel amount, target $\phi$) and the output of the controlled system (actual $\phi$) match and it becomes easier to understand the behavior of the controlled system.

Third Embodiment

A third embodiment where the invention is applied to an electronic throttle system will be described on the basis of FIGS. 7 and 8.

Figure 7:
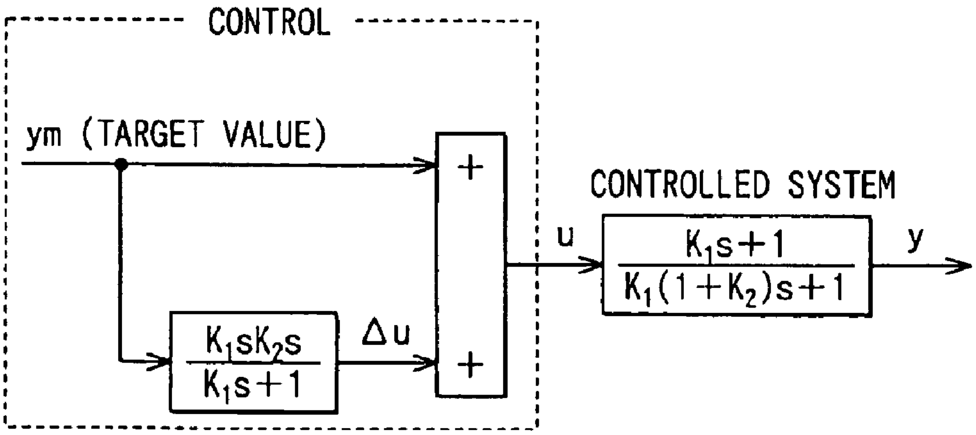
FIG. 7 is a block diagram describing a derivation method of a control expression used in a third embodiment.

In the first and second embodiments, a controlled system was approximated by a first-order lag system, but in the third embodiment, the controlled system is approximated as shown in FIG. 7 in order to more accurately model the controlled system. In this case, the output y (actual throttle opening) of the controlled system can be made to match the target value ym (target throttle opening) as long as the control (inverse model of the transfer function of the controlled system) in the dotted lines of FIG. 7 can be realized.

However, because constants $K_1$ and $K_2$ of the controlled system are unknown or vary, they cannot be expressed with the control equation of FIG. 7.

Thus, in the third embodiment, a method that detects and controls the constants $K_1$ and $K_2$ of the controlled system is adopted.

First, the transfer function of the control equation $K_1 K_2 s/(K_1 s+1)$ is transformed to make it easy to develop.

$$K_1K_2s/(K_1s+1)=K_2s/(s+1/K_1)=\beta s/(s+\alpha)$$

Here, $\alpha=1/K_1$ and $\beta=K_2$.

Moreover, the transfer function of the control equation $(K_1 s+1)/\{K_1 (1+K_2) s+1\}$ is transformed to make it easy to develop.

$$\begin{aligned}(K_1s+1)/\{K_1(1+K_2)s+1\} &= (s+1/K_1)/\{(1+K_2)s+1/K_1\}\\ &= (s+\alpha)/\{(1+\beta)s+\alpha\}\end{aligned}$$

Thus, the relation between the input u (control input) and the output y (controlled value) of the controlled system is represented by the following equation.

$$y=(s+\alpha)/\{(1+\beta)s+\alpha\}\cdot u \qquad [1]$$

Also, the relation between the target value ym and the control input u is represented by the following equation.

$$u=\{1+\beta hs/(s+\alpha h)\}ym \qquad [2]$$

Here, $\alpha h$ represents the estimated value of $\alpha$ and $\beta h$ represents the estimated value of $\beta$.

When equation [2] is assigned to equation [1], it becomes as follows.

$$\begin{aligned}y &= (s+\alpha)/\{(1+\beta)s+\alpha\}\cdot\{1+\beta hs/(s+\alpha h)\}ym\\ &= (s+\alpha)/\{(1+\beta)s+\alpha\}\times\{(1+\beta h)s+\alpha h\}/(s+\alpha h)\times ym\end{aligned}$$

Here, when the error e between the target value ym and the actual output y is defined as e=ym−y and the above equation is assigned, the error e is represented as follows.

$$\begin{aligned}e &= \frac{(\beta-\beta h)s^2+(\alpha h\beta-\alpha\beta h)s}{(1+\beta)s^2+\{(1+\beta)+\alpha h+\alpha\}s+\alpha\alpha h}\times ym\\ &= \frac{s}{(1+\beta)s^2+\{(1+\beta)+\alpha h+\alpha\}s+\alpha\alpha h}\times[\beta-\beta h(\alpha h\beta-\alpha\beta h)]\times\begin{pmatrix}\frac{dym}{dt}\\ ym\end{pmatrix}\end{aligned}$$

$$\varepsilon = e + c_1\int e\,dt \qquad [3]$$

$$\varepsilon = \frac{s+c_1}{(1+\beta)s^2+\{(1+\beta)\alpha h+\alpha\}s+\alpha\alpha h}\times[\beta-\beta h(\alpha h\beta-\alpha\beta h)]\times\begin{pmatrix}\frac{dym}{dt}\\ ym\end{pmatrix}$$

$$\frac{d\phi_1}{dt} = -\gamma_\beta\frac{dym}{dt}\varepsilon \qquad (\phi_1=\beta-\beta h,\ \phi_2=\alpha h\beta-\alpha\beta h)$$

$$\frac{d\beta h}{dt} = \gamma_\beta\frac{dym}{dt}\varepsilon$$

When $\beta h$ becomes $\beta$, $\epsilon$ is represented as follows.

$$\varepsilon = \frac{\beta(s+c_1)}{(1+\beta)s^2+\{(1+\beta)\alpha h+\alpha\}s+\alpha h}\begin{pmatrix}0 & \alpha h-\alpha\end{pmatrix}\times\begin{pmatrix}\frac{dym}{dt}\\ ym\end{pmatrix} \qquad [4]$$

$$\frac{d\phi'_2}{dt} = -\gamma_\alpha ym\varepsilon \qquad (\phi'_2=\alpha h-\alpha)$$

$$\frac{d\alpha h}{dt} = -\gamma_\alpha ym\varepsilon$$

When the F/F corrected value ucmp is expressed as an equation, it becomes the following.

$$\begin{aligned}ucmp &= K2h\cdot ym - 1/K1h\cdot\int ucmp\cdot dt\\ &= \beta h\cdot ym - \alpha h\cdot\int ucmp\cdot dt\end{aligned}$$

Here, $\beta h$ and $\alpha h$ are determined from the relation of equation [3] and equation [4].

In this case, if the error $\epsilon$ is not 0, the $d\alpha h/dt$ of equation [4] does not become 0 and the problem arises that $\alpha h$ continues to be updated. In other words, if it has a steady-state deviation, the problem arises that $\alpha h$ always continues to be updated.

Thus, in the third embodiment, in order to update $\alpha h$ to only the scene where the F/F control works, the following equation, where the previous F/F corrected value ucmp is multiplied by the right part of equation [4], is used to calculate αh.

$$d\alpha h/dt = -\gamma\alpha\cdot ym\cdot\varepsilon\cdot ucmp = -\gamma\alpha\cdot z_1$$

$$z_1 = ym\cdot\varepsilon\cdot ucmp$$

Figure 8:
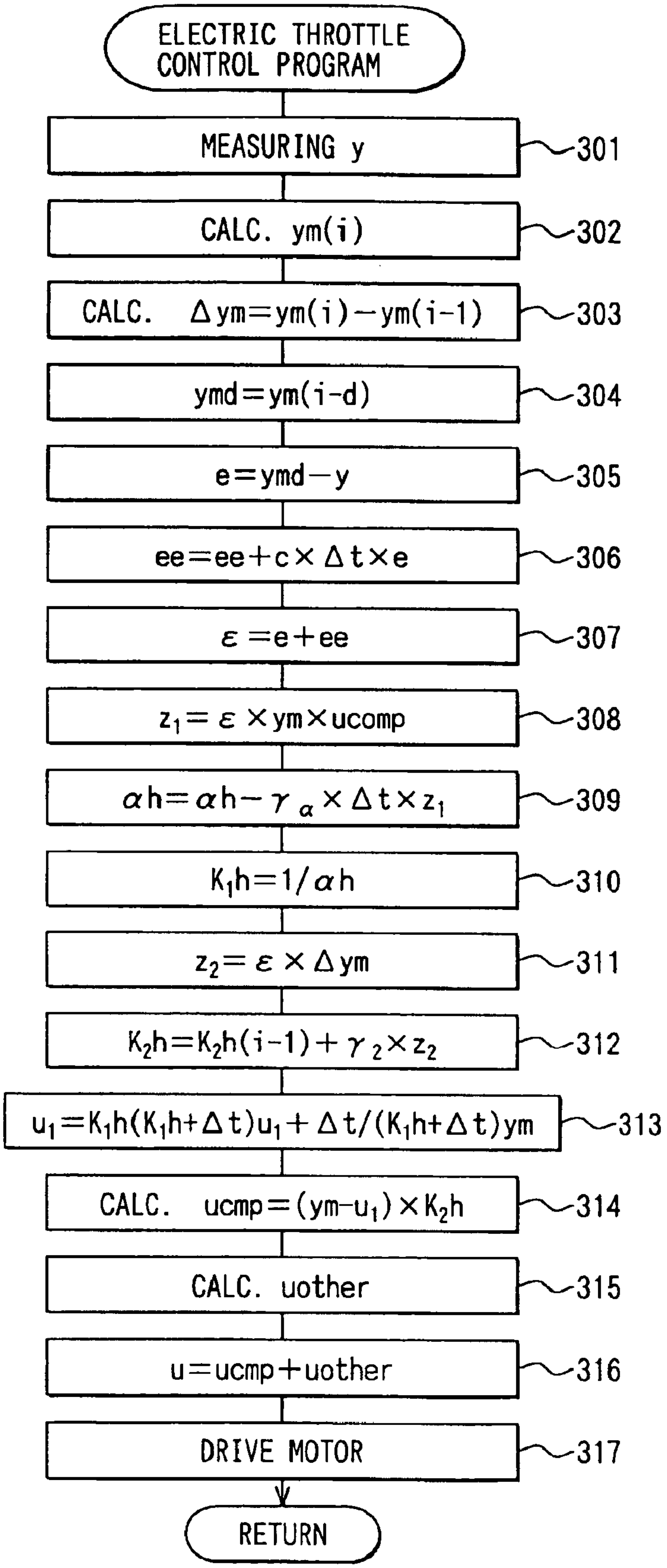
FIG. 8 is a flow chart showing the flow of processing of an electronic throttle control program of the third embodiment.

The ECU 27 periodically executes the electronic throttle control program of FIG. 8, whereby it functions as gain calculating means and feedforward corrected value calculating means which are referred to in the scope of the patent claims, the ECU 27 adaptively determines the gain K2*h* on the basis of a value $z_2$ obtained by multiplying the derivative value Δym of the target throttle opening by the sum (e+c·∫edt) of the error e between the target throttle opening ym (target value) and the actual throttle opening y (actual controlled value) and the integral value of that error, and determines, as the F/F corrected value ucmp, a value obtained by multiplying the gain K2*h* by the difference value ($ym-u_1$) between the target throttle opening ym and a value $u_1$ of the first-order lag of the target throttle opening.

In this case, when the value $u_1$ of the first-order lag of the target throttle opening ym is calculated, the first-order lag time constant (estimated value of $K_1$) thereof is adaptively determined on the basis of the value $z_1$ obtained by multiplying the target throttle opening ym and the previous F/F corrected value ucmp by the sum ε (=e+ee) of the error e between the target throttle opening ym and the actual throttle opening y and the integral value ee of that error.

Moreover, when the error e between the target throttle opening ym and the actual throttle opening y is determined in consideration of the fact that the controlled system has dead time d, the target throttle opening ymd at the point in time going back in the past by the amount of the dead time d is used to obtain error e=ymd−y. The specific processing content of the electronic throttle control program of FIG. 8 will be described below.

When the program is started, first the actual throttle opening y (actual controlled value) is measured in step 301 by the throttle opening sensor 16, and the target throttle opening ym (i) that is the target value is calculated in step 302 on the basis of the accelerator opening. Thereafter, the program proceeds to step 303, where the difference value Δym (derivative value of the target value) between the current value ym(i) of the target throttle opening and the previous value ym (i−1) is calculated.

$$\Delta ym = ym(i) - ym(i-1)$$

Then, in step 304, the target throttle opening ym (i−d) at the point in time going back in the past by the amount of the dead time d is read and dead time processing is implemented. Thereafter, the program proceeds to step 305, where the error e (=ymd−y) between the target throttle opening ymd and the actual throttle opening y is calculated.

Thereafter, the program proceeds to step 306, where the integral value ee of the error e is calculated by the following equation.

$$ee = ee + c\times\Delta t\times e$$

(c: constant; Δt: control period)

Then, in step 307, the sum ε (=e+ee) of the error e and the integral value ee thereof is calculated. Thereafter, the program proceeds to step 308, where the target throttle opening ym and the previous F/F corrected value ucmp are multiplied by ε to determine $z_1$.

$$z_1 = \epsilon\times ym\times ucmp$$

Thereafter, the program proceeds to step 309, where αh is calculated by the following equation.

$$\alpha h = \alpha h - \gamma\alpha\times\Delta t\times z_1$$

(γα: constant)

Thereafter, the program proceeds to step 310, where the first-order lag time constant K1*h* used in calculating the value $u_1$ of the first-order lag of the target throttle opening ym is calculated by the following equation using αh.

$$K1h = 1/\alpha h$$

Then, in step 311, the value $z_2$ (=ε×Δym), which is obtained by multiplying the target throttle opening difference value Δym by ε, is calculated. Thereafter, the program proceeds to 312, where the gain K2*h* (estimated value of the constant $K_2$) is calculated by the following equation.

$$K2h = K2h(i-1) + \gamma_2\times z_2$$

Here, K2*h* (i−1) represents the previous gain and $\gamma_2$ represents a constant (>0).

Thereafter, the program proceeds to step 313, where the value $u_1$ of the first-order lag of the target throttle opening ym is calculated by the following equation using the first-order lag time constant K1*h*.

$$u_1 = K1h/(K1h+\Delta t)\cdot u_1 + \Delta t/(K1h+\Delta t)\cdot ym$$

Then, the program proceeds to step 314, where the value obtained by multiplying the gain K2*h* by the difference value ($ym-u_1$) between the target throttle opening ym and the value $u_1$ of the first-order lag of the target throttle opening ym is determined as the F/F corrected value ucmp.

$$ucmp = (ym - u_1)\times K2h$$

Thereafter, the program proceeds to step 315, another corrected value uother such as an F/B corrected value is calculated. Thereafter, the program proceeds to step 316, where the other corrected value uother is added to the F/F corrected value ucmp to determine the control input u.

$$u = ucmp + uother$$

It should be noted that the program may also be configured so that ucmp and uother are determined by a correction factor and ucmp and uother are multiplied by a base value to determine the control input u.

Then, in step 317, the motor 17 is driven by the control input u so that the actual throttle opening y is made to match the target throttle opening ym.

In the electronic throttle control of the above-described third embodiment, control precision can be further improved over the first embodiment because the precision of the model of the controlled system is improved over the first embodiment.

Fourth Embodiment

Figure 9:
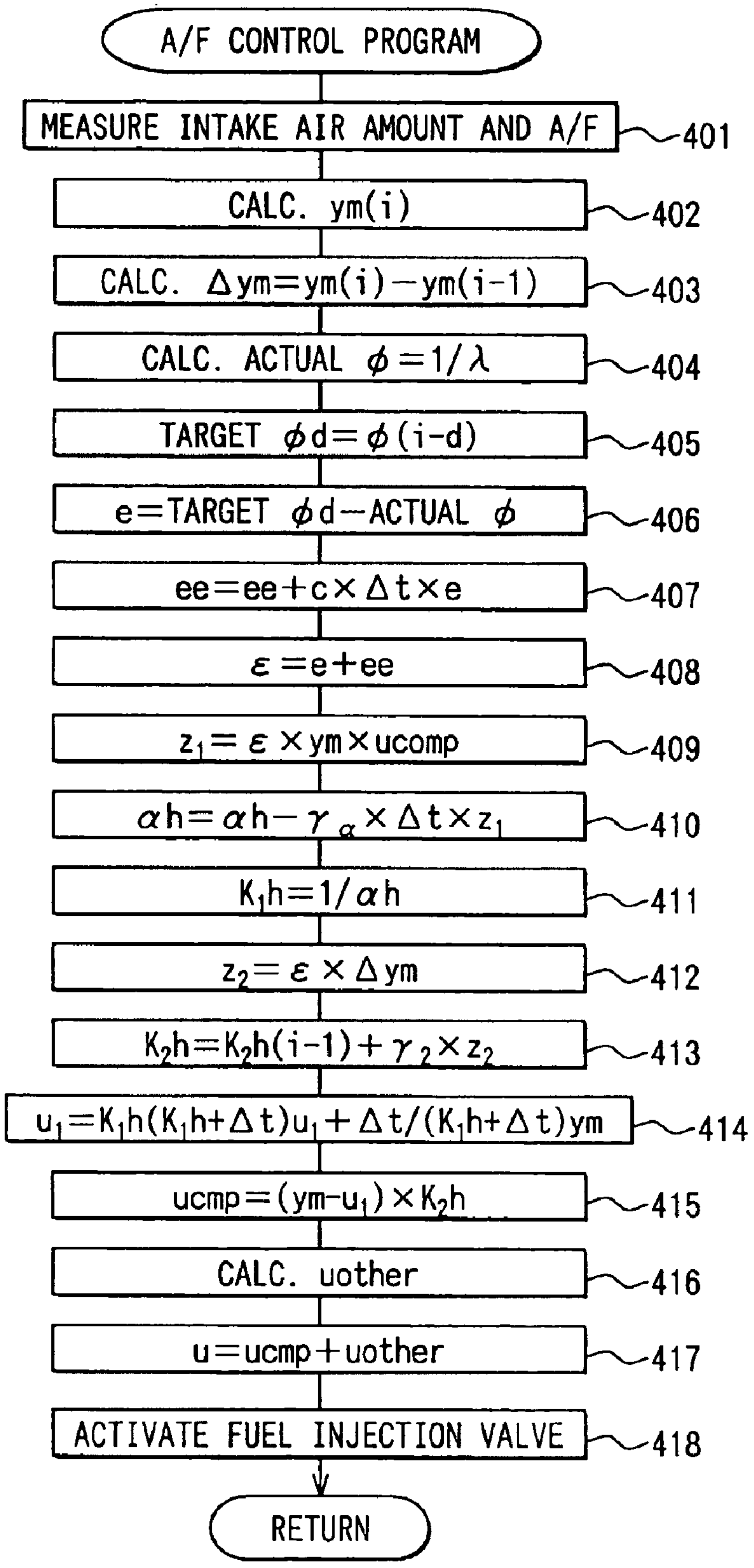
FIG. 9 is a flow chart showing the flow of processing of an air-fuel ratio control program of a fourth embodiment.

Next, a fourth embodiment where the invention is applied to an air-fuel ratio control system will be described on the basis of FIGS. 9 and 10. Similar to the second embodiment, when an air-fuel control system is used as the controlled system, consideration is given to the fact that the output y (air-fuel ratio) of the controlled system is detected by the air-fuel ratio sensor 24 disposed at the exhaust pipe 22, the gain K2*h* is adaptively determined on the basis of the value $z_2$ obtained by multiplying the derivative value Δym of the target fuel amount by the sum (e+c·∫edt) of the error e between the target ϕ (target excess fuel ratio) and the actual ϕ detected by the air-fuel ratio sensor 24 and the integral value of that error, and a value obtained by multiplying the gain K2*h* by the difference value ($ym-u_1$) between the target fuel amount ym and the value $u_1$ of the first-order lag of the target fuel amount is determined as the F/F corrected value ucmp. In this case, when the error e between the target ϕ and the actual ϕ is determined in consideration of the fact that the controlled system has dead time d, the target ϕ (=ϕd=ϕ (i−d)) at the point in time going back in the past by the amount of the dead time d is used to obtain the error e=target ϕd−actual ϕ. Also, in order to more precisely model the controlled system, the controlled system is modeled by a commonly known fuel behavior model as shown in FIG. 7. The specific processing content of the air-fuel ratio control program of FIG. 9 will be described below.

When the program is started, first the intake air amount and the air-fuel ratio are measured in step 401, and the target fuel amount ym (i) is calculated in step 402 on the basis of the intake air amount. Thereafter, the program proceeds to step 403, where the difference value Δym (derivative value of the target value) between the current value ym (i) of the target fuel amount and the previous value ym (i−1) is calculated.

$$\Delta ym=ym(i)-ym(i-1)$$

Then, in step 404, the actual ϕ (=1/λ) is calculated from the measured air-fuel ratio. Thereafter, the program proceeds to step 405, where the target ϕ (i−d) at the point in time going back in the past by the amount of dead time d is read and dead time processing, where ϕd=ϕ (i−d), is implemented. Thereafter, the program proceeds to step 406, where the error e (=target ϕd−actual ϕ) between the target ϕd at the point in time going back in the past by the amount of the dead time d and the actual ϕ is calculated.

Thereafter, the program proceeds to step 407, where the integral value ee of the error e is calculated by the following equation.

$$ee=ee+c\times\Delta t\times e$$

(c: constant; Δt: control period)

Then, in step 408, the sum ϵ (=e+ee) of the error e and the integral value ee thereof is calculated. Thereafter, the program proceeds to step 409, where the target fuel amount ym and the previous F/F corrected value ucmp are multiplied by ϵ to determine $z_1$.

$$z_1=\epsilon\times ym\times ucmp$$

Thereafter, the program proceeds to step 410, where αh is calculated by the following equation.

$$\alpha h=\alpha h-\gamma\alpha\times\Delta t\times z_1$$

(γα: constant)

Thereafter, the program proceeds to step 411, where the first-order lag constant K1*h* used in calculating the value $u_1$ of the first-order lag of the target fuel amount ym is calculated by the following equation using αh.

$$K1h=1/\alpha h$$

Then, in step 412, the value $z_2$ (=ϵ×Δym), which is obtained by multiplying the target fuel amount difference value Δym by ϵ, is calculated. Thereafter, the program proceeds to 413, where the gain K2*h* (estimated value of the constant $K_2$) is calculated by the following equation.

$$K2h=K2h(i-1)+\gamma_2\times z_2$$

Here, K2*h* (i−1) represents the previous gain and $\gamma_2$ represents a constant (>0).

Thereafter, the program proceeds to step 414, where the value $u_1$ of the first-order lag of the target fuel amount ym is calculated by the following equation using the first-order lag time constant K1*h*.

$$u_1=K1h/(K1h+\Delta t)\cdot u_1+\Delta t/(K1h+\Delta t)\cdot ym$$

Then, in step 415, a value obtained by multiplying the gain K2*h* by the difference value ($ym-u_1$) between the target fuel amount ym and the value $u_1$ of the first-order lag of the target fuel amount is determined as the F/F corrected value ucmp.

$$ucmp=(ym-u_1)\times K2h$$

Thereafter, the program proceeds to step 416, where another corrected value uother such as a basic injection amount and an F/B corrected value is calculated. Thereafter, the program proceeds to step 417, where the other corrected value uother is added to the F/F corrected value ucmp to determine the control input u.

$$u=ucmp+uother$$

It should be noted that the program may also be configured so that ucmp and uother are determined by a correction factor and ucmp and uother are multiplied by a base value to determine the control input u.

Then, in step 418, the fuel injection valve 20 is driven by the control input u so that the actual ϕ is made to match the target ϕ.

In the air-fuel ratio control of the above-described fourth embodiment, control precision can be further improved over the second embodiment because the precision of the model of the controlled system is improved over the second embodiment.

Figure 10A:
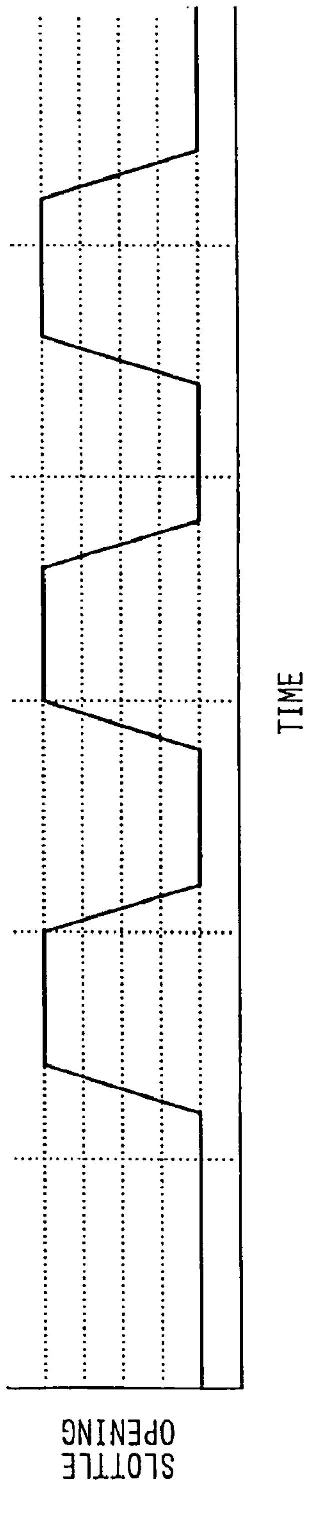
FIGS. 10A and 10B are time charts describing an example of the air-fuel ratio control of the fourth embodiment.
Figure 10B:
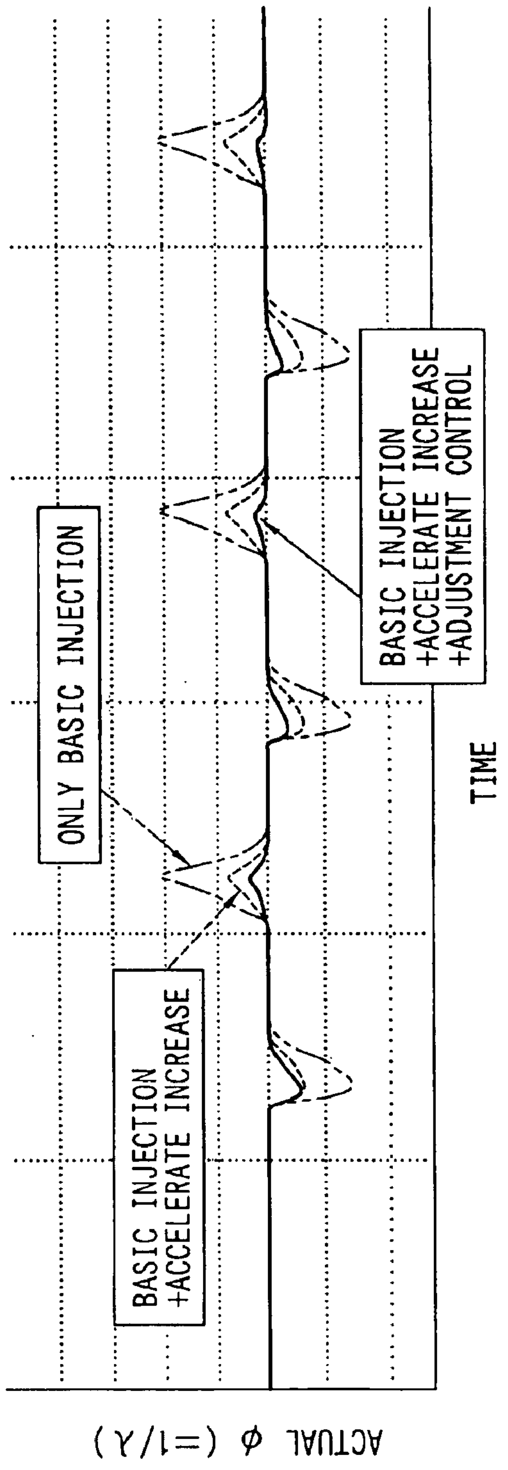

FIGS. 10A and 10B show the behavior of the air-fuel ratio control of the fourth embodiment. Because the fourth embodiment is configured so that F/F control is corrected by adaptive control, variations in the actual ϕ of the transient state can be effectively reduced by the F/F corrected value ucmp resulting from adaptive control, and driveability in the transient state and exhaust emissions can be improved.

Fifth Embodiment

In equations [3] and [4] of expression [1] described in the third embodiment, ϵ (sum of the error e between the target value and the actual controlled value and the integral value ee of that error) was used, but in the fifth embodiment, the error e between the target value and the actual controlled value is used in place of ϵ and equations [3] and [4] of expression [1] are changed to the following equations [3'] and [4'].

$$d\beta h/dt=-\gamma\beta\cdot dym/dt\cdot e \qquad [3']$$

$$d\alpha h/dt=-\gamma\alpha\cdot ym\cdot e \qquad [4']$$

In the fifth embodiment also, in order to update αh to only the scene where the F/F control works, the following equation, where the previous F/F corrected value ucmp is multiplied by the right part of equation [4'], is used to calculate αh.

$$d\alpha h/dt = -\gamma\alpha \cdot ym \cdot e \cdot ucmp$$
$$= -\gamma\alpha \cdot z_1$$
$$z_1 = ym \cdot e \cdot ucmp$$

In other words, the fifth embodiment uses "error e" in place of "ε" in the third embodiment.

Effects that are the same as those of the third embodiment can be obtained even if the invention is configured in this manner.

It should be noted that the range of application of the invention is not limited to an electronic throttle system and an air-fuel ratio control system. The invention can also be applied to and implemented in various control systems disposed in vehicles, such as idle speed control, value valve control and cruise control systems.

What is claimed is:

1. A vehicular control system that conducts feedforward control so that a controlled value of a controlled system disposed in a vehicle is made to follow a target value, the vehicular control system comprising:

gain calculating means for adaptively determining a gain based on a value obtained by multiplying a derivative value of the target value by the error between the target value and the actual controlled value; and feedforward corrected value calculating means for determining, as a feedforward corrected value, a value obtained by multiplying the gain by the derivative value of the target value.

2. The vehicular control system of claim 1, wherein the gain calculating means uses the target value at a point in time going back in the past by an amount of dead time when determining the error between the target value and the actual controlled value.

3. The vehicular control system of claim 1, wherein the controlled system is an air-fuel ratio control system, the gain calculating means adaptively determines the gain based on a value obtained by multiplying the derivative value of a target fuel amount by the error between a target excess fuel ratio and an actual excess fuel ratio, and the feedforward corrected value calculating means determines, as the feedforward corrected value, a value obtained by multiplying the gain by the derivative value of the target fuel amount.

4. A vehicular control system that conducts feedforward control so that a controlled value of a controlled system disposed in a vehicle is made to follow a target value, the vehicular control system comprising:

gain calculating means for adaptively determining a gain based on a value obtained by multiplying a derivative value of the target value by the sum of the error between the target value and the actual controlled value and an integral value of that error; and feedforward corrected value calculating means for determining, as a feedforward corrected value, a value obtained by multiplying the gain by a difference value between the target value and a value of a first-order lag of the target value.

5. The vehicular control system of claim 4, wherein when the feedforward corrected value calculating means calculates the value of the first-order lag of the target value, the feedforward calculating means adaptively determines a first-order lag time constant thereof on the basis of a value obtained by multiplying the target value by the sum of the error between the target value and the actual controlled value and the integral value of that error.

6. The vehicular control system of claim 4, wherein the gain calculating means uses the target value at a point in time going back in the past by an amount of dead time when determining the error between the target value and the actual controlled value.

7. The vehicular control system of claim 4, wherein the feedforward corrected value calculating means includes means for removing the effects of steady-state deviation between the target value and the actual controlled value.

8. The vehicular control system of claim 7, wherein the means for removing the effects of steady-state deviation removes the effects of steady-state deviation by multiplying a previous feedforward corrected value in a process that calculates the first-order time constant.

9. The vehicular control system of claim 4, wherein the controlled system is an air-fuel ratio control system, the gain calculating means adaptively determines the gain based on a value obtained by multiplying the derivative value of a target fuel amount by the sum of the error between a target excess fuel ratio and an actual excess fuel ratio and the integral value of that error, and the feedforward corrected value calculating means determines, as the feedforward corrected value, a value obtained by multiplying the gain by the integral value between the target fuel amount and a value of the first-order lag of the target fuel amount.

10. A vehicular control system that conducts feedforward control so that a controlled value of a controlled system disposed in a vehicle is made to follow a target value, the vehicular control system comprising:

gain calculating means for adaptively determining a gain based on a value obtained by multiplying a derivative value of the target value by the error between the target value and the actual controlled value;

first-order lag time constant calculating means for adaptively determining a first-order lag time constant of the target value on the basis of a value obtained by multiplying a previous feedforward corrected value by the error between the target value and the actual controlled value; and feedforward corrected value calculating means for determining, as a feedforward corrected value, a value obtained by multiplying the gain by a difference value between the target value and the value of the first-order lag of the target value calculated using the first-order lag time constant.

* * * * *